(12) United States Patent
Chang

(10) Patent No.: US 8,050,026 B2
(45) Date of Patent: Nov. 1, 2011

(54) HARDWARE FASTENING STRUCTURE FOR COMPUTER

(75) Inventor: Chin-Ming Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 78 days.

(21) Appl. No.: 12/560,338

(22) Filed: Sep. 15, 2009

(65) Prior Publication Data

US 2011/0017887 A1 Jan. 27, 2011

(30) Foreign Application Priority Data

Jul. 24, 2009 (CN) .......................... 2009 10 304776

(51) Int. Cl.
G06F 1/16 (2006.01)
H05K 5/00 (2006.01)
H05K 7/00 (2006.01)
(52) U.S. Cl. .............................. 361/679.33; 361/679.34
(58) Field of Classification Search . 361/679.33–679.39
See application file for complete search history.

(56) References Cited

U.S. PATENT DOCUMENTS

| | | | |
|---|---|---|---|
| 6,351,378 B1 * | 2/2002 | Chao et al. ............... | 361/679.33 |
| 6,853,549 B2 * | 2/2005 | Xu .............................. | 361/679.39 |
| 7,031,152 B1 * | 4/2006 | Tsai et al. ................. | 361/679.33 |
| 7,198,338 B2 * | 4/2007 | Liu et al. ..................... | 312/223.1 |
| 7,310,235 B2 * | 12/2007 | Chen et al. .................... | 361/752 |
| 7,382,610 B2 * | 6/2008 | Lin et al. ................... | 361/679.33 |
| 2003/0043550 A1 * | 3/2003 | Ives ................................. | 361/726 |
| 2004/0075978 A1 * | 4/2004 | Chen et al. ...................... | 361/685 |
| 2005/0243507 A1 * | 11/2005 | Lambert et al. ................ | 361/685 |
| 2007/0019377 A1 * | 1/2007 | Chen et al. ..................... | 361/685 |
| 2007/0247802 A1 * | 10/2007 | Imsand .............................. | 361/685 |
| 2008/0007908 A1 * | 1/2008 | Chen ............................ | 361/685 |
| 2008/0055841 A1 * | 3/2008 | Tao et al. ....................... | 361/685 |
| 2008/0144274 A1 * | 6/2008 | Chen et al. ..................... | 361/685 |
| 2008/0151523 A1 * | 6/2008 | Chen et al. ..................... | 361/807 |
| 2008/0259554 A1 * | 10/2008 | Qin et al. ....................... | 361/685 |
| 2009/0073651 A1 * | 3/2009 | Hu et al. ................... | 361/679.58 |
| 2009/0196680 A1 * | 8/2009 | Hu et al. ....................... | 403/102 |

* cited by examiner

Primary Examiner — Jinhee Lee
Assistant Examiner — Adrian S Wilson
(74) Attorney, Agent, or Firm — Altis Law Group, Inc.

(57) ABSTRACT

A hardware fastening structure for fastening hardware of a computer includes a housing, a brace, a number of sliding bars. The housing includes a bottom plate and an attaching structure formed on the bottom plate. The brace is mounted on the bottom plate via the attaching structure of the housing. The sliding bars are respectively mounted on opposite sides of the hardware to fix the hardware on the brace, wherein the brace forms fixing structures corresponding to the sliding bars and the sliding bars being operable to slide in the brace, and engage and disengage with the brace via the fixing structures.

4 Claims, 4 Drawing Sheets

HARDWARE FASTENING STRUCTURE FOR COMPUTER

BACKGROUND

1. Technical Field

The disclosure relates to hardware fastening structures for use in computers to stably holding and supporting hard disk drive and CD-ROM drives and so on.

2. Description of Related Art

Hard disk drives and CD-ROM drives are very important components in computers to store or access data, they must be stably mounted inside the housing of a computer thereby getting a stable work environment and correspondingly prolonging their lifespans. Generally, the hard disk drives and the CD-ROM drives are interconnected to each other in a stacked-manner by a number of separated fasteners, which results in that the assembling processes and the repairing processes of the hard disk drives and CD-ROM drives are time-consuming and difficult because lager member of fasteners need to be assembled to or detached from those hard disk drives and CD-ROM drives.

Therefore, what is needed is to provide a hardware fastening structure which can overcome the disadvantage above mentioned.

DETAILED DESCRIPTION

Figure 1:
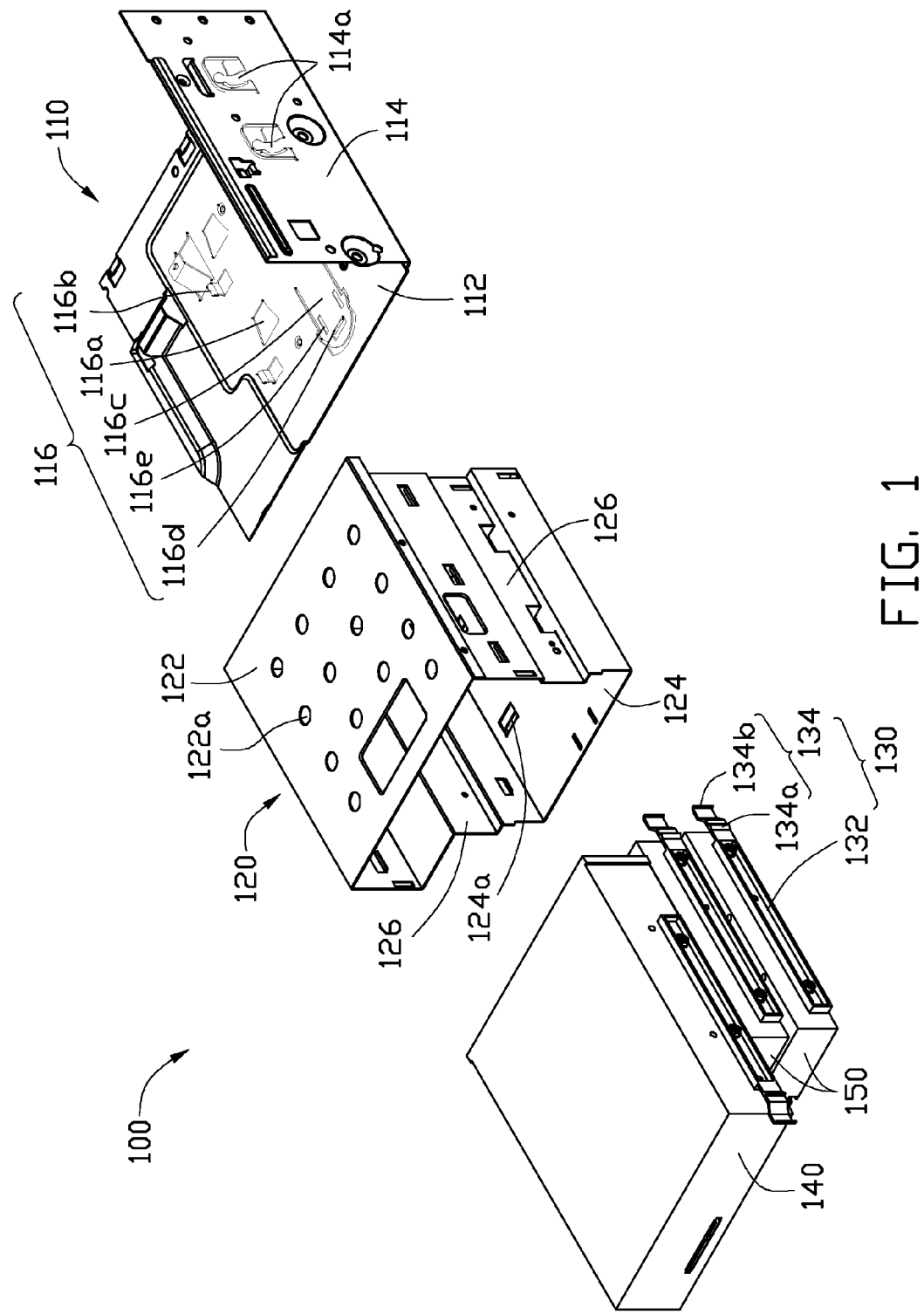
FIG. 1 is an exploded, isometric view of a hardware fastening structure according to an exemplary embodiment.

Referring to FIG. 1, a hardware fastening structure 100 according to an exemplary embodiment is shown. The hardware fastening structure 100 includes a housing 110 of a computer, a brace 120, and a number of sliding bars 130. The brace 120 is attached to the inside of the housing 110. A CD-ROM drive 140 and a hard disk drive 150, as exemplary devices, are fixedly received in the brace 120 by the sliding bars 130.

Figure 3:
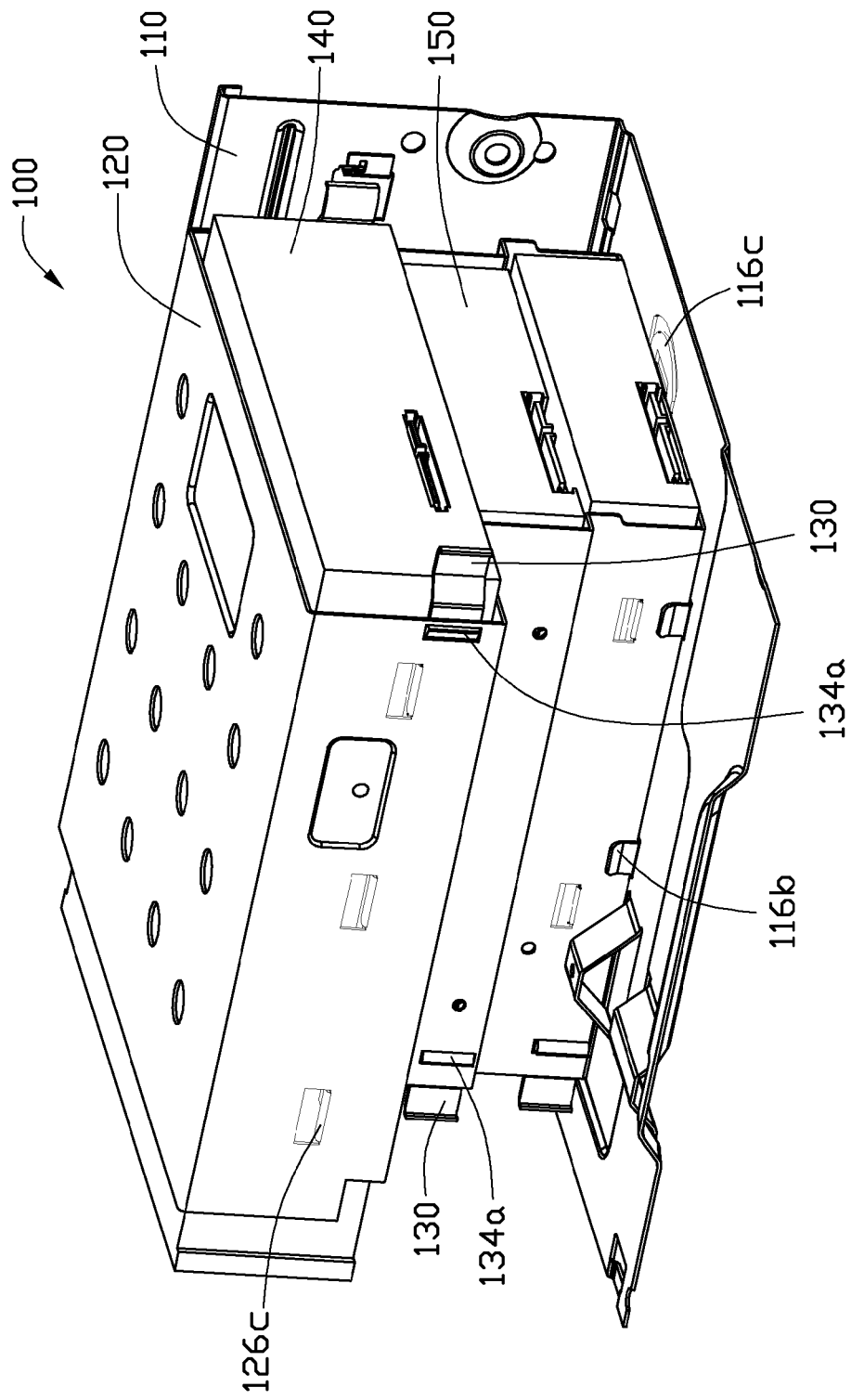
FIG. 3 is an assembled, isometric view of the hardware fastening structure shown in FIG. 1.
Figure 4:
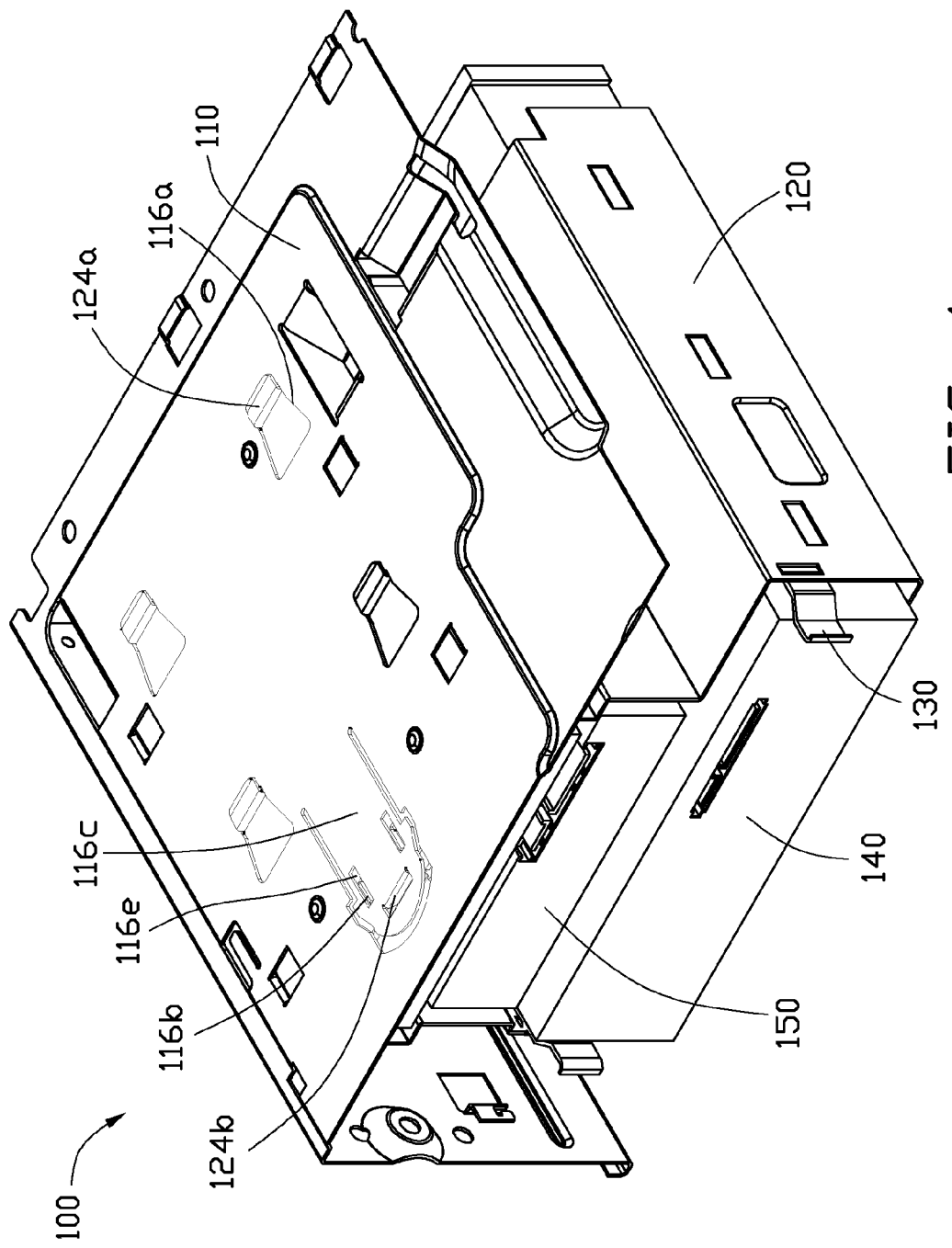
FIG. 4 is an isometric view of hardware fastening structure shown in FIG. 3 from a reverse angle.

The housing 110 is a protection shell for receiving a series of different electrical elements of the computer therein. In the present exemplary embodiment, a portion of the housing 110 is shown in FIGS. 1, 3 and 4. The housing 110 includes a bottom plate 112 and a side wall 114 perpendicularly extended from a periphery of the bottom plate 112. The bottom plate 112 defines four holes 116a arranged in a 2×2 matrix therein, and includes two locating tabs 116b and a resilient tab 116c. Each of the holes 116a is trapezoidal shaped and includes a wider end and an opposite narrower end. The two locating tabs 116b are punched upwards from the bottom plate 112 and spaced away from the side wall 114 by a predetermined distance. The resilient tab 116c is formed on the bottom plate 112 by slicing into the bottom plate 112 between the side wall 114 and the locating tabs 116b along a horseshoe curve. The resilient tab 116c therefore includes a free end separated from the bottom plate 112 and a connection end connecting the bottom plate 112. The resilient tab 116c further includes a bar 116d formed adjacent to the free end of the resilient tab 116c and a pair of slots 116e separately defined in the resilient tab 116c and perpendicular to the bar 116d. The pair of slots 116e are located adjacent to the opposite ends of the bar 116d, respectively. The holes 116a, locating tabs 116b, resilient tab 116c, bar 116d, and slots 116e cooperatively construct an attaching structure 116 for holding the brace 120 on the housing 110. In addition, the side wall 114 includes a pair of clamping tabs 114a resiliently bent inwards, thereby enhancing the stability of the brace 120 on the housing 110.

Figure 2:
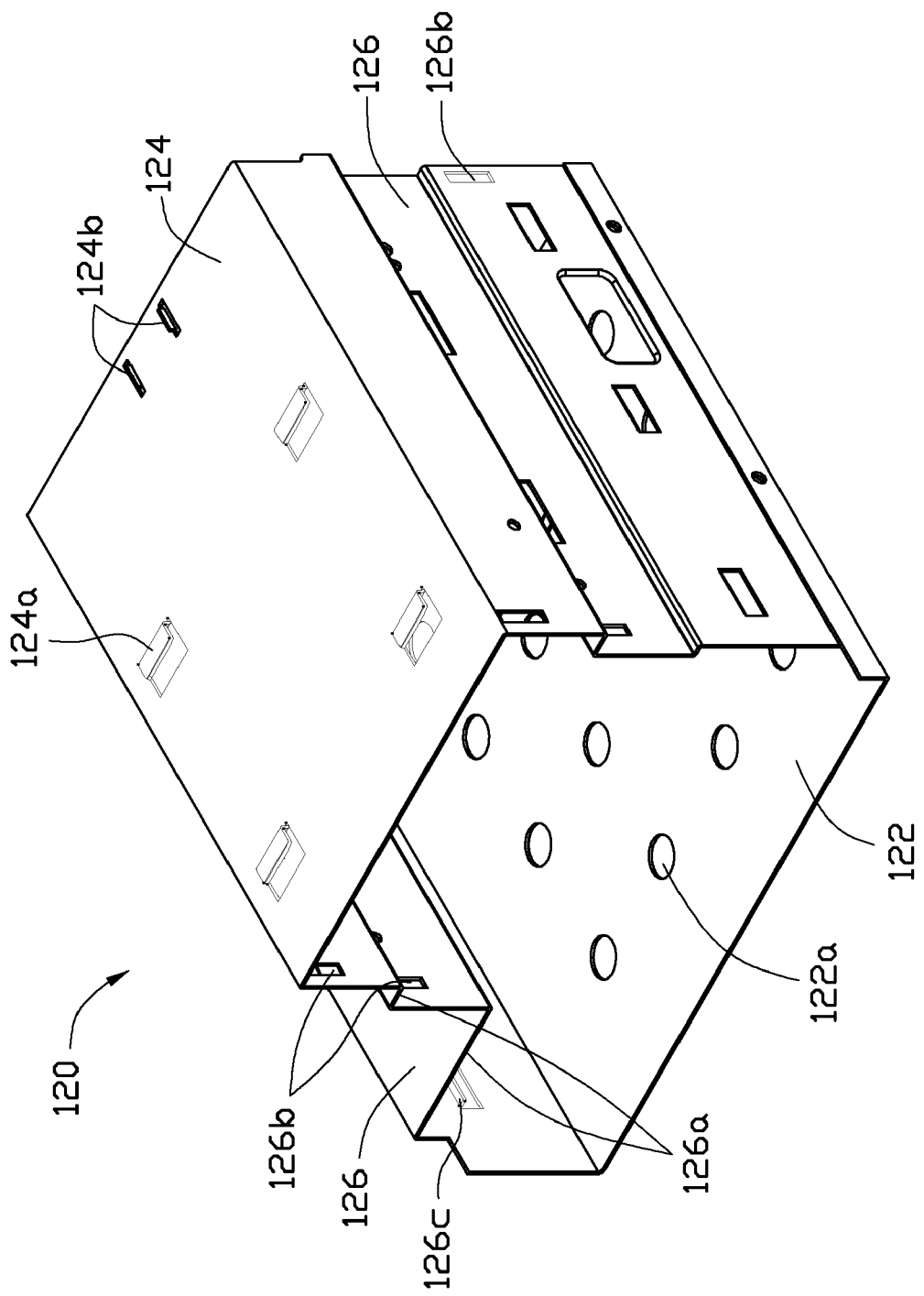
FIG. 2 is an isometric view of a brace of the hardware fastening structure shown in FIG. 1, viewed from a reverse angle.

Referring to FIG. 2, the brace 120 includes an upper plate 122, a lower plate 124 parallel to the upper plate 122, and two separated side plates 126 perpendicularly interconnected with the upper and lower plates 122, 124. The upper plate 122 defines a number of apertures 122a therein for dissipating heat inside the brace 120. The lower plate 124 includes a number of hooks 124a punched outwards from the lower plate 124 corresponding to the holes 116a of the bottom plate 112, and a pair of parallel ribs 124b projecting outwards corresponding to the slots 116e of the resilient tab 116c. Each of the side plates 126 is perpendicularly bent to form a series of stages 126a for separately supporting the CD-ROM drive 140 and the hard disk drive 150. Each of the side plates 126 defines a number of vertical slot 126b adjacent to an end thereof and corresponding to each of the stages 126a. Alternatively, each of the side plates 126 may includes a number of limiting arms 126c that are punched inwards from the side plate 126 and protrudes into the inside of the brace 120 for limiting the sliding bars 130.

The sliding bars 130 are respectively attached on opposite side surfaces of the CD-ROM drive 140 and the hard disk drive 150. Each of the sliding bars 130 includes a slender sliding portion 132 fixedly mounted on the corresponding CD-ROM drive 140 or the hard disk drive 150, and a locking portion 134 extended from an end of the sliding portion 132. The locking portions 134 are made of resilient material therefore can be flexed laterally relative to the sliding portion 132. Each of the locking portions 134 includes a catch 134a with a slope surface, and a handle 134b projected beyond a terminal end of the corresponding CD-ROM drive 140 or the hard disk drive 150. The catches 134a of the locking portions 134 are configured for fitting in the corresponding vertical slots 126b of the brace 120 to prevent the corresponding CD-ROM drive 140 and the hard disk drive 150 from disengaging from of the brace 120. The handles 134b of the locking portion 134 are configured for detaching the catches 134a from the vertical slots 126b of the brace 120 when being pushed laterally to detach the CD-ROM drive 140 or/and the hard disk drive 150 from the brace 120.

Referring to FIGS. 3 and 4, in assembly, the CD-ROM drive 140 and hard disk drive 150 are respectively supported in the stages 126a of the brace 120 and fixed on the brace 120 by the sliding bars 130. The catches 134a are respectively fitted in the vertical slots 126b of the brace 120. The limiting arms 126c tightly press the sliding portions 132 of the sliding bars 130 for stably and precisely restricting the CD-ROM drive 140 and hard disk drive 150 in the brace 120. The brace 120 as well as the CD-ROM drive 140 and hard disk drive 150 are mounted in the housing 110 by the attaching structure 116. The hooks 124a is inserted into the hole 116a through the wider end, and then is slid to the narrow end of the hole 116a to clasp the bottom plate 112. The bar 116d of the resilient tab 116c resists on an end of the lower plate 124 of the brace 120 accompanying with the ribs 124b of the brace 120 fitting in the slots 116e of the resilient tab 116c to stably hold the brace 120. The locating tabs 116b of the bottom plate 116 and the clamping tabs 114a of the side wall 114 cooperatively clamp the brace 120 to enhance the stability of the brace 120 on the housing 100. When to detach the CD-ROM drive 140 and/or hard disk drive 150 from the brace 120, it just needs to push the handles 134 of the sliding bars 130 to disengage the catches 134a from the vertical slot 126b of the brace 120, and then to take the CD-ROM drive 140 and/or hard disk drive 150 out from the brace 120. The detachment of the brace 120 can be simply achieved by sliding the brace 120 from the narrow end to the wider end of the holes 116a after the ribs 124b have been disengaged from the slot 116e by pressing the resilient tab 116c outwards.

As the description above, it is appreciated that the hardware fastening structure 100 is simple in structure and simplifies the assembling and detaching processes of the hardware such as hard disk drives and CD-ROM drives in the housing of a computer, thereby overcoming the disadvantage in related art.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A hardware fastening structure for fastening hardware for computer, the hardware fastening structure comprising:
   a housing comprising a bottom plate and an attaching structure formed on the bottom plate;
   a brace mounted on the bottom plate via the attaching structure, the brace comprising two side plates parallel to each other, each side plate forming a stage for directly supporting the hardware; and
   a pair of sliding bars respectively mounted on opposite sides of the hardware to fix the hardware on the brace, wherein the brace forms fixing structures corresponding to the sliding bars and the sliding bars are operable to slide in the brace, and to engage with and disengage from the brace via the fixing structures,
   wherein the housing comprises a side wall perpendicularly extending from a periphery of the bottom plate, the attaching structure comprises a locating tab, a resilient tab and defines a plurality of trapezoidal holes, the locating tab is punched upwards from the bottom plate and spaced away from the side wall, the resilient tab is formed on the bottom plate and located between the locating tab and the side wall, the trapezoidal hole are matrix-arranged in the bottom plate and located between the side wall, the locating tab, and the resilient tab, the resilient tab comprises a free end opposite to the trapezoidal holes and defining a slot in the free end, each trapezoidal hole defines a wider end adjacent to the resilient tab and a narrower end far away from the resilient tab, the brace comprises a lower plate perpendicularly connected to the side plates and disposed on the bottom plate and located between the locating tab and the side wall, the lower plate forms a plurality of hooks and a rib, the hooks inserts into the respective trapezoidal holes, the rib corresponds to the slot, and the free end abuts the lower plate such that the hooks are limited to be engaged with the respective narrower ends and the rib is engaged with the slot.

2. The hardware fastening structure as claimed in claim 1, wherein the side wall comprises two clamping tabs resiliently bent inwards, which resiliently presses on the brace.

3. The hardware fastening structure as claimed in claim 1, wherein the brace comprises an upper plate perpendicularly connected to the side plates and parallel to the lower plate, and the upper plate defines a plurality of apertures therein for dissipating heat inside the brace.

4. The hardware fastening structure as claimed in claim 1, wherein the hooks of the brace is punched outwards from the lower plate.

* * * * *